US008468496B2

(12) United States Patent
Jahn et al.

(10) Patent No.: US 8,468,496 B2
(45) Date of Patent: Jun. 18, 2013

(54) FLEXIBLE ATTRIBUTE MANAGEMENT IN WORKFLOW PROCESSING SYSTEMS

(75) Inventors: Janeen E. Jahn, Lafayette, CO (US); Simon P. Jones, Warwick (GB); Linda S. Liebelt, Boulder, CO (US); Kyle P. Manning, Lafayette, CO (US); Dwight R. Palmer, Longmont, CO (US); Eric M. Sigler, Boulder, CO (US); Matthew M. Walli, Longmont, CO (US)

(73) Assignee: Ricoh Production Print Solutions LLC, Boulder, CO (US)

( * ) Notice: Subject to any disclaimer, the term of this patent is extended or adjusted under 35 U.S.C. 154(b) by 1443 days.

(21) Appl. No.: 11/279,054

(22) Filed: Apr. 7, 2006

(65) Prior Publication Data

US 2007/0240099 A1    Oct. 11, 2007

(51) Int. Cl.
*G06F 9/44* (2006.01)
(52) U.S. Cl.
USPC ............................ 717/121; 717/107; 717/120
(58) Field of Classification Search
None
See application file for complete search history.

(56) References Cited

U.S. PATENT DOCUMENTS

| | | | | |
|---|---|---|---|---|
| 6,078,982 | A * | 6/2000 | Du et al. | 710/200 |
| 6,239,880 | B1 * | 5/2001 | Barrett et al. | 358/1.16 |
| 6,272,672 | B1 * | 8/2001 | Conway | 717/107 |
| 6,430,609 | B1 * | 8/2002 | Dewhurst et al. | 709/220 |
| 6,578,006 | B1 * | 6/2003 | Saito et al. | 705/7.26 |
| 6,738,155 | B1 * | 5/2004 | Rosenlund et al. | 358/1.15 |
| 6,952,726 | B1 * | 10/2005 | White et al. | 709/224 |
| 6,970,844 | B1 * | 11/2005 | Bierenbaum | 705/39 |
| 7,003,723 | B1 * | 2/2006 | Kremer et al. | 715/234 |
| 7,051,328 | B2 * | 5/2006 | Rai et al. | 718/102 |
| 7,065,567 | B1 * | 6/2006 | Squires et al. | 709/223 |
| 7,155,662 | B1 * | 12/2006 | Edwards et al. | 715/229 |
| 7,168,077 | B2 * | 1/2007 | Kim et al. | 718/106 |
| 7,194,730 | B2 * | 3/2007 | Pramberger | 717/120 |
| 7,213,232 | B1 * | 5/2007 | Knowles | 717/121 |
| 7,240,324 | B2 * | 7/2007 | Casati et al. | 717/103 |
| 7,272,820 | B2 * | 9/2007 | Klianev | 717/109 |
| 7,451,432 | B2 * | 11/2008 | Shukla et al. | 717/106 |
| 7,464,333 | B2 * | 12/2008 | Yamamoto | 715/273 |
| 7,640,548 | B1 * | 12/2009 | Yu et al. | 718/106 |
| 7,900,152 | B2 * | 3/2011 | Nielsen et al. | 715/764 |
| 7,917,555 | B2 * | 3/2011 | Gottumukkala et al. | 707/953 |
| 2002/0040469 | A1 * | 4/2002 | Pramberger | 717/121 |
| 2002/0138543 | A1 * | 9/2002 | Teng et al. | 709/102 |

(Continued)

OTHER PUBLICATIONS

Diimitrios Georgakopoulos et al., "An Overview of Workflow Management: From Process Modeling to Workflow Automation Infrastructure", Kluwer Academic Publishers, 1995, <http://bpmfocus.workflowpatterns.com/documentation/documents/workflow95.pdf> pp. 1-34.*

(Continued)

*Primary Examiner* — Thuy Dao
*Assistant Examiner* — Samuel Hayim
(74) *Attorney, Agent, or Firm* — Duft Bornsen & Fettig, LLP

(57) ABSTRACT

Methods, systems, and apparatus for improved ease and flexibility in defining attribute values for jobs in a workflow processing system. The job attributes are presented to a user grouped or organized by their relationship to various elements of the workflow model used to process the job type. Further, default values for job attributes may be flexibly defined based on elements of the workflow model that utilize the job attribute and/or based on dynamic computations of functions involving the various job attributes and other parameters.

8 Claims, 4 Drawing Sheets

U.S. PATENT DOCUMENTS

| | | | |
|---|---|---|---|
| 2002/0138577 A1* | 9/2002 | Teng et al. | 709/205 |
| 2002/0152254 A1* | 10/2002 | Teng | 709/100 |
| 2002/0191213 A1* | 12/2002 | Laverty et al. | 358/1.15 |
| 2003/0144982 A1* | 7/2003 | Reulein et al. | 707/1 |
| 2003/0208743 A1* | 11/2003 | Chong et al. | 717/106 |
| 2003/0220905 A1* | 11/2003 | Amado et al. | 707/1 |
| 2004/0078105 A1* | 4/2004 | Moon et al. | 700/100 |
| 2004/0263902 A1* | 12/2004 | Wei et al. | 358/1.15 |
| 2005/0018236 A1* | 1/2005 | Shirai et al. | 358/1.14 |
| 2005/0114766 A1* | 5/2005 | Yamamoto | 715/527 |
| 2005/0243365 A1* | 11/2005 | Noda | 358/1.15 |
| 2006/0037000 A1* | 2/2006 | Speeter et al. | 717/120 |
| 2006/0161895 A1* | 7/2006 | Speeter et al. | 717/121 |
| 2006/0200797 A1* | 9/2006 | Grasselt et al. | 717/107 |
| 2006/0206864 A1* | 9/2006 | Shenfield et al. | 717/107 |
| 2006/0259524 A1* | 11/2006 | Horton | 707/201 |
| 2007/0022027 A1* | 1/2007 | Gupta et al. | 705/35 |
| 2009/0089741 A1* | 4/2009 | Bornhoevd et al. | 717/106 |

OTHER PUBLICATIONS

Mochiko Oba et al., "Multiple Type Workflow Model for Enterprise Application Integration", IEEE, 2001, <http://ieeexplore.ieee.org/stamp/stamp.jsp?tp=&arnumber=927079>, pp. 1-8.*

Fabio Casati et al., "Specification and Implementation of Exceptions in Workflow Management Systems", ACM, 1999, <http://delivery.acm.org/10.1145/330000/328996/p405-casati.pdf>, pp. 1-47.*

* cited by examiner

FLEXIBLE ATTRIBUTE MANAGEMENT IN WORKFLOW PROCESSING SYSTEMS

BACKGROUND OF THE INVENTION

1. Field of the Invention

The invention relates to the field of definition and utilization of attributes in a workflow processing system and more specifically relates to methods and structures for simplifying user interaction to define attributes of jobs in a workflow processing system.

2. Related Patents

This patent application is related to U.S. patent application Ser. No. 11/279,052 entitled CUSTOMER-CONFIGURABLE WORKFLOW SYSTEM (hereinafter referred to as the "sibling" application), filed concurrently herewith and hereby incorporated by reference.

3. Statement of the Problem

Workflow processing systems generally process jobs in accordance with a workflow model or job type. A job may be processed by a sequence of one or more phases, each of which may comprise one or more processes, each process may comprise one or more steps. Inputs are applied to the various phases, processes, and steps and appropriate output may be generated from the various phases, processes, and steps. The workflow model or job type defines the particular sequence of phases, processes, and steps appropriate to process a particular kind of job. The sibling patent application noted above provides one exemplary workflow processing system with significant customer configurability to allow more flexible definition of jobs and associated workflow models.

In such a workflow processing system, it is common that a particular job and/or workflow model may include a significant number of parameters or attributes defining aspects of processing the job. It is common that a complex job may be defined in terms of hundreds if not thousands of job attributes or parameters. The user of the workflow system must configure each of these numerous attributes so that the job will be properly processed by the workflow processing system.

A first problem arises in current workflow processing systems in presenting a large number of job attributes to be defined by the user. Organizing such a large number of attributes is a problem in and of itself. Current techniques simply present a linear list of job attributes to be defined, in some cases sorted alphabetically by name or other ID. The user must then walk through each of the various attributes in that order and alter any attribute values necessary to appropriately configure processing for the associated job. Further, largely manual, human processes in defining attribute values to configure workflow processing for a particular job is highly prone to error. Though numerous reasonable default values may be presented to the user, the actual desired value may be dependent upon a complex function of numerous factors relating not only to the job itself but also to aspects of the workflow processing system, the environment in which the job will be processed, and other dynamic factors that may change as a job progresses through the workflow processing system. Determining and defining such complex values for attributes of a job gives rise to numerous opportunities for human error and thus incorrect job processing.

It is evident from the above discussion that a need exists for an improved system and methods that allows for better user interaction to present attributes for configuring by the user and also permits more flexibility and richness in defining attribute values for a job.

SUMMARY OF THE SOLUTION

The invention solves the above and other related problems with methods and associated systems and apparatus that provide for improved ease and flexibility in defining attribute values for jobs in a workflow processing system. The job attributes are presented to a user grouped or organized by their relationship to various elements of the workflow model used to process the job type. Further, default values for job attributes may be flexibly defined based on elements of the workflow model that utilize the job attribute and/or based on dynamic computations of functions involving the various job attributes and other parameters.

One aspect hereof provides a method for configuring attributes of a job for processing of the job in a work flow processing system. The method includes presenting attributes of the job to a user wherein the job attributes are grouped in accordance with aspects of a workflow model associated with execution of the job in the workflow processing system. The method also includes generating attribute values for attributes of the job based on user input.

Another aspect hereof provides a method for processing of a job in a workflow processing system in accordance with a plurality of attributes. The method includes defining values for attributes of a job in a database associated with the job to be processed wherein the plurality of attributes are grouped in accordance with a workflow model defining the sequence steps for processing the job. The method also includes sharing the attribute values in the database among all components associated with steps for processing of the job.

The invention may include other exemplary embodiments described below.

DESCRIPTION OF THE DRAWINGS

The same reference number represents the same element on all drawings.

DETAILED DESCRIPTION OF THE INVENTION

FIGS. 1 through 4 and the following description depict specific exemplary embodiments of the present invention to teach those skilled in the art how to make and use the invention. For the purpose of this teaching, some conventional aspects of the invention have been simplified or omitted. Those skilled in the art will appreciate variations from these embodiments that fall within the scope of the present invention. Those skilled in the art will appreciate that the features described below can be combined in various ways to form multiple variations of the present invention. As a result, the invention is not limited to the specific embodiments described below, but only by the claims and their equivalents.

Figure 1:
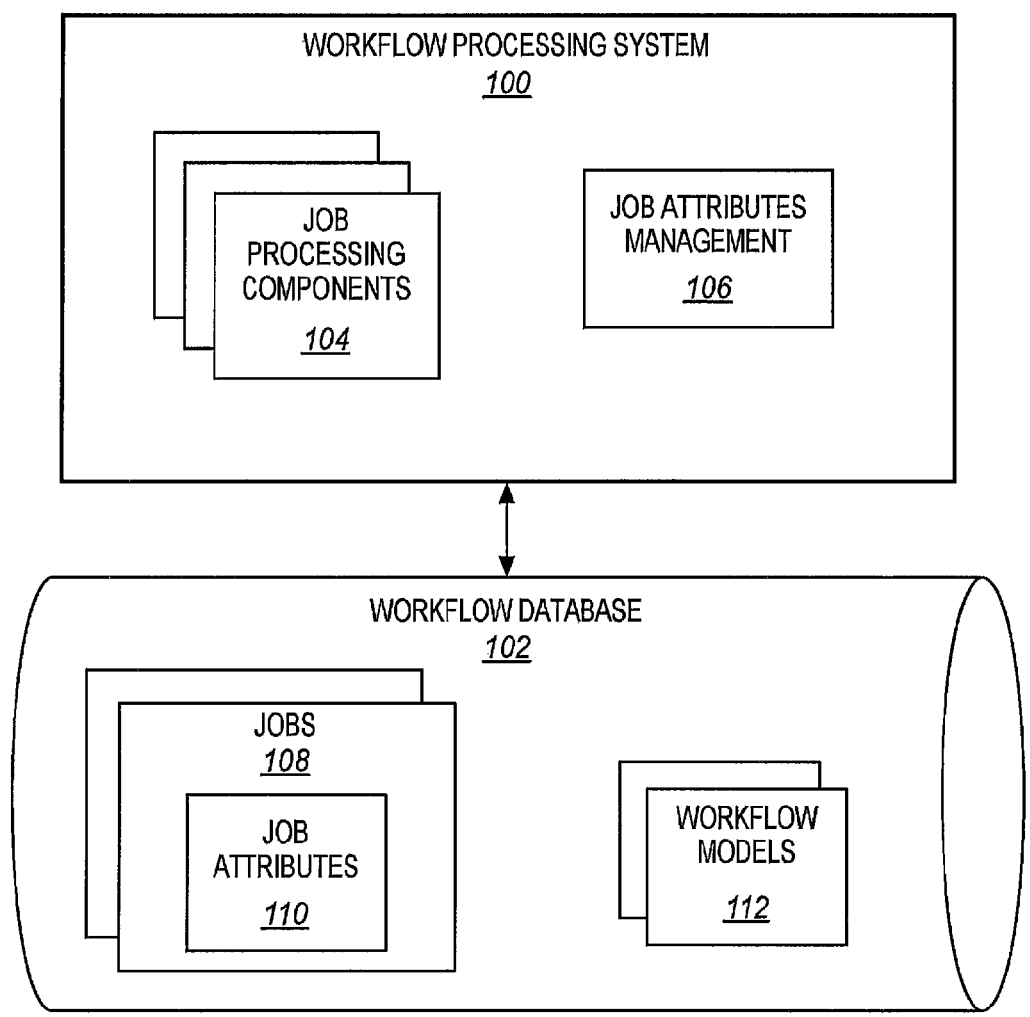
FIG. 1 is a block diagram of an exemplary workflow processing system enhanced in accordance with features and aspects hereof to enable improved user interaction to configure job attributes.

FIG. 1 is a block diagram of a workflow processing system 100 enhanced in accordance with features and aspects hereof. Exemplary of such a workflow processing system 100 is the system architecture disclosed in the above identified sibling patent application. Such a workflow processing system 100 utilizes integrated workflow database 102 to store all information regarding jobs 108 to be executed by the system as well as workflow models 112 (e.g., job types) defining specific sequences of phases, processes, and steps to be performed for a corresponding type of job to be executed. Workflow processing system 100 executes a job 108 in accordance with the sequence of phases, processes, and steps defined by a corresponding workflow model 112. The various steps defined by the workflow model 112 may invoke numerous other processing components 104 within or associated with the workflow processing system 100. For example, in the context of a printing environment, the workflow processing system 100 may process print jobs 108 in accordance with corresponding workflow models 112. Job processing components 104 may include various elements useful in processing of a print job including, for example, translation components, rasterizing components, formatting components, print engine components, post processing components, etc. Those of ordinary skill in the art will readily recognize that the job processing components 104 may be tightly integrated within the workflow processing system 100 as shown in FIG. 1 or may be separate and distinct elements. The various components 104 and the workflow processing system 100 preferably share access to information in the integrated workflow database 102.

As noted above, each job 108 includes an associated plurality of job attributes 110. The complexity of manually configuring a significant number of such job attributes, potentially numbering in the hundreds if not thousands, has been an ongoing problem for such workflow processing systems. In accordance with features and aspects hereof, job attributes management element 106 provides enhanced capabilities to improve configuring and utilizing job attributes in the workflow processing system 100.

As noted above, a first broad improvement provided by features and aspects hereof in job attribute management element 106 is to present the plurality of job attributes grouped or organized in accordance with aspects of the workflow model associated with the job. As described elsewhere herein and as more thoroughly discussed in the sibling patent application, a workflow model defines the processing for the corresponding type of job as a sequence of one or more phases, each comprising one or more processes, each process comprising one or more steps. Such a workflow model is generally constructed from predefined templates to permit simpler generation and configuration of the workflow model by users. Thus, in accordance with features and aspects hereof, a user is presented with the job attributes to be defined grouped in accordance with the workflow model phase, process, and/or step to which the attribute is related. Other attributes may be related more globally to the job itself as distinct from any particular phase, process, and/or step. Still further, those of ordinary skill in the art will recognize that a single attribute may be associated with more than one such grouping. For example, a particular attribute could be associated both with multiple steps as well as with the corresponding phase. Or, for example, a single step may be utilized in multiple phrases and thus a job attribute could be defined for the same step in multiple different phases. Thus, presenting all job attributes to be defined to a user grouped in accordance with the workflow processing element to which the attribute relates simplifies the task for the user by clarifying what feature the attribute relates to.

Still further, in accordance with features and aspects hereof, job attribute management 106 may determine a default value for one or more of the attributes associated with the job. The determination of a default value is enhanced in accordance with features and aspects hereof to permit more flexible determination of such a default value based on a number of factors. In one aspect, job attribute management 106 may determine default values based on the workflow model template which utilizes the associated job attribute. The default value (if any) so determined may then be overridden by a particular instance of a step in the workflow process and/or overridden by job type or other hierarchically higher templates used in defining the workflow model. Still further, the default value may be overridden by user input. In addition, default values may be dynamically determined based upon computable functions associated with various aspects of the environment in which the workflow processing system is operating. Various environmental aspects of the system may change dynamically as job execution proceeds. For example, the number of server nodes used in the workflow processing system 100 may change dynamically or the present number of jobs being executed changes as the system proceeds. The number or availability of various other job processing components 104 in the workflow processing system 100 may also change dynamically as the job is executed. Any number of such dynamic, changing, environmental values may be considered in a function used to compute a default value for corresponding job attribute. The dynamic computation of an attribute value may also be based on values of other job attributes already defined. Still further, the dynamic computation may involve dynamic, syntactic symbol replacement features to dynamically determine the function to be used in computing a default value. Thus the function itself may be dynamically altered based upon environmental aspects of the workflow processing system 100 and its progress in executing one or more jobs 108. These and other determination techniques are discussed further herein below.

Those of ordinary skill in the art will readily recognize that FIG. 1 is merely intended as suggestive of an exemplary system architecture embodying features and aspects hereof. In particular, those of ordinary skill in the art will readily recognize that workflow processing system 100 may comprise any number of computing nodes such that the processing and workload may be distributed over any number of such computing devices. Similarly, workflow processing database 102 may be directly coupled to workflow processing system 100 or may be implemented using network storage architecture features as well known in the art. Storage for database 102 may also be centralized or distributed over an enterprise. Thus, architectures to centralize or distribute the data stored in workflow database 102 and/or the computation performed by workflow processing system 100 are well known to those of ordinary skill in the art as typical matters of design choice.

Figure 2:
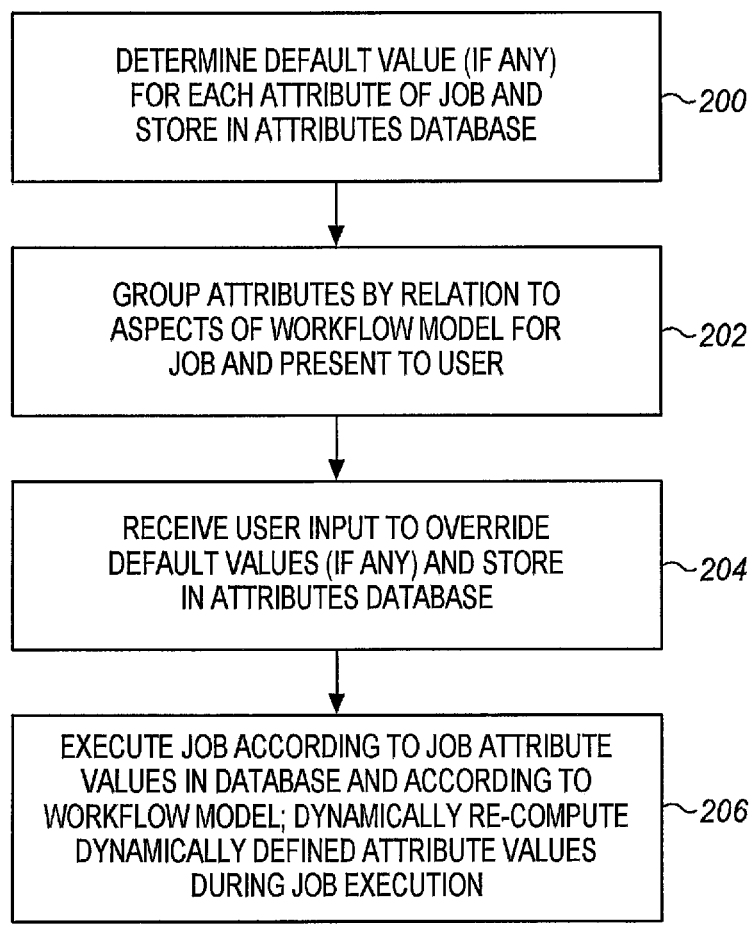
FIGS. 2 and 3 are flowcharts describing exemplary methods in accordance with features and aspects hereof to improve user interaction and flexibility in defining values for job attributes in a workflow processing system.

FIG. 2 is a flowchart broadly describing and method in accordance with features and aspects hereof to improve job attribute management and utilization in a workflow processing system. The method of FIG. 2 may be performed within any appropriate computing node associated with the workflow processing system as it initiates and continues processing of the a job. Element 200 is first operable to determine a default value (if any) for each attribute of a job and to store the determined default value in an attributes database for subsequent utilization by other aspects hereof. Element 202 is then operable to group the job attributes in accordance with their respective relation to aspects of the corresponding workflow model used for executing the job. In addition, element 202 is operable to present the grouped job attributes to a user to permit user input for overriding any determined default values. Element 204 is next operable to receive user input from any suitable user input device (e.g., voice input, keyboard input, pointer device input, etc.). A user may change or override a default value prior to commencement of job execution.

With the current default values for each attribute defined and the job attributes presented to the user grouped as indicated, the user may more easily identify job attributes that require changes and enter any modified default values. Lastly, element 206 is next operable to execute the job according to the job attribute values presently set in the attributes database and in accordance with the workflow model definition of phases, processes, and steps. As noted above and as discussed further herein below, some job attribute values may be dynamically determined based upon current operating environment parameters of the workflow processing system. Thus, processing of element 206 may also include dynamically computing the attribute values when the value is first used in the job execution. Thus, job attribute default values that are to be determined dynamically as execution of a job proceeds, may be re-computed during job execution just prior to the attribute being utilized.

As noted above, processing of FIG. 2 preferably stores all job attributes and respective default values in a job attributes database. As shown above in FIG. 1, the job attributes database may be implemented simply as tables in the integrated workflow database or, as a matter of design choice, may be implemented as a separate database. In one aspect, the attribute name may be utilized to associate the attribute with a particular job executing in a particular workflow model at a particular phase, process, and step. To hide all such structure, a simple access method may be provided to set an attribute value by providing the attribute name and value. A corresponding access method to get an attribute value by supplying the attribute name may also be provided. The get attribute value method may, for example, dynamically compute the current attribute value where the attribute's value is defined as a function of other parameters or attributes of the workflow processing system. Structures and associated methods for storing attribute values in such a database and for accessing the attribute values will be readily apparent to those of ordinary skill in the art as a matter of design choice.

Figure 3:
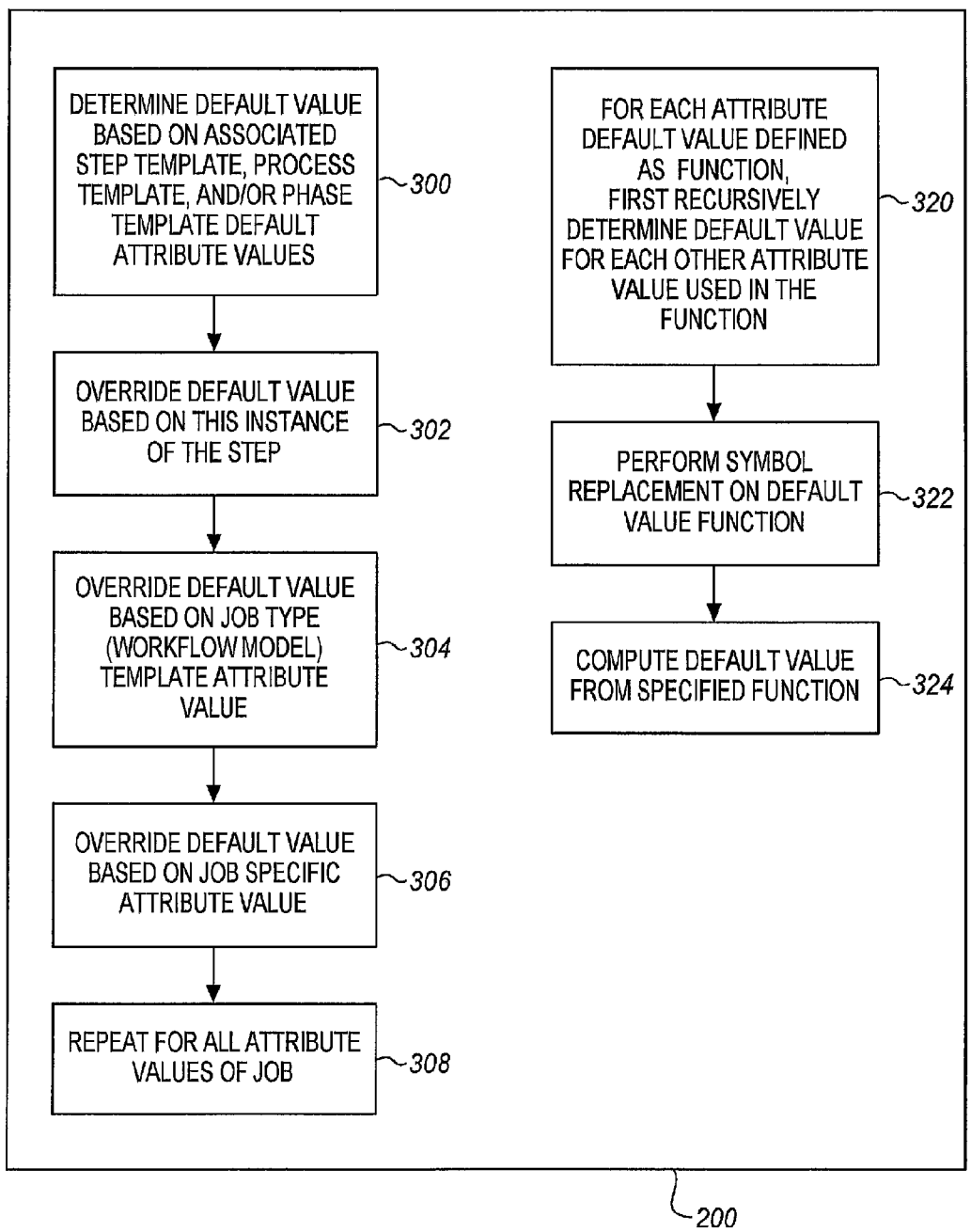

FIG. 3 is a flowchart providing additional exemplary details of the processing of element 200 of FIG. 2. As noted above, element 200 of FIG. 2 is operable to determine a default value (if any) for each attribute of a job. FIG. 3 provides additional exemplary details of particular techniques in accordance with features and aspects hereof to flexibly define a default value for a job attribute. In general, job attributes may be defined by templates associated with the various phases, processes, and steps that comprise a workflow model associated with processing a particular job. Default values from such templates may be used such that a hierarchy may be established whereby a particular step default value for an attribute may be overridden by a particular job type template attribute default attribute value which may, in turn, be overridden by user input or job specific attribute values. Still further, as noted above, attribute default values may be defined as functions of other attribute values and other aspects of the environment in which the workflow processing is executing a particular job. Still further, such a function may include dynamic definition of the function itself by performing symbol replacement on the function that defines a computation for default value. Therefore, the default value computational function, per se, may be dynamically defined. Still further, default values for any particular job attribute may also be defined by combinations of these various features. Techniques and structures to combine such features for determining default values will be readily apparent to those of ordinary skill in the art.

Elements of 300 through 308 describe processing to determine a default value based on aspects of the workflow model associated with the execution of the particular job. As noted above, a workflow model defines a sequence of phases, processes, and steps useful for executing a particular associated job type. The workflow model may be defined by configuring instances of predefined templates for useful phases, processes, and steps. Each such template may define default values for job attributes associated with the corresponding workflow model element. Element 300 is therefore first operable to determine a default value for a particular job attribute based on the workflow model template from which the job attribute was generated. The template used may be a step template, process template, and/or a phase template used in defining the workflow model. The default attribute value so determined may then be overridden by processing of element 302 where a particular instance of a particular step, process, or phrase is defined in the workflow model. As noted above, any particular step may be instantiated multiple times in a particular phase or multiple times over different phases or processes. Thus, a default value determined by a particular step template could be overridden by a particular instance of a step in the workflow model. The default value thus far determined by processing of elements 300 and 302 may be further overridden by the template associated with the entire job type or workflow model. Element 304 therefore represents a next hierarchical layer that may override default values thus far determined by lower hierarchical aspects of the workflow model. Still further, element 306 may be operable to override any defaults attribute value thus far determined by elements 300 through 304 based on aspects specific to the particular job being executed. Elements 300 through 306 therefore may determine the default attribute value for any job attribute based upon predefined default values that may be hierarchically defined in aspects of the workflow model and/or the particular job to be execute.

Any default value so determined may then be stored in the attributes database for future access and processing by the workflow processing system. Element 308 then indicates that steps 300 through 306 may be repeated for all attributes of a job for which default values may be determined.

Those of ordinary skill in the art will readily recognize database structures associated with job attributes to indicate the attributes relationship to particular phases, processes, steps, job types, or specific instances of such elements. For example, the attributes database may include multiple entries each defining a possible default attribute value for a particular job attribute based upon this hierarchical model of elements that may override one another. Processing of elements 300 through 308 therefore compute a default value (if any) based on such a hierarchical overriding of such multiple default values.

Elements 320 through 324 represent processing to determine a job attribute default value based on dynamic computations associated with the environment of the workflow processing system executing a particular job. In general, a job attribute default value may be defined as a function of other job attribute values or any other aspect of the environment of the workflow processing system executing one or more jobs. Such functions may, for example, reference attribute values for other job attributes of a particular job. Thus, element 320 is first operable to recursively utilize this method to determine current or default values job attribute values referenced in this function to determine a job attribute default value. Such recursive programming techniques are well known to those of ordinary skill in the art. Next, element 322 is operable to perform syntactic symbol replacement in the function used to determine a default or current value for the job attribute. As noted, a function used for determining a default value may reference other attribute values or environmental parameters associated with operation of the workflow processing system. References to other attribute or parameter values may be indicated by symbolic reference to the name of the other attribute or by a reserved keyword variable used to reference the current value of a particular attribute or parameter of the operating workflow processing system. Thus, element 322 searches the function being evaluated for such symbolic references and replaces such a reference by the corresponding current value. Element 324 then computes the default or current value for an attribute using the specified function. As noted, recursive invocation of the method of elements 320 through 324 may be utilized to fully evaluate the current value of any function regardless of the number of references to other attribute or parameter values. Those of ordinary skill in the art will readily recognize programming techniques to avoid infinite loop computations based on such indirect references to other attribute or parameter values.

Those of ordinary skill in the art will readily recognize numerous equivalent methods for organizing, presenting, and determining current or default values for job attributes in a workflow processing system. The methods of FIGS. 2 and 3 and the structure of FIG. 1 are therefore intended merely as exemplary of one possible embodiment of features and aspects hereof.

Figure 4:
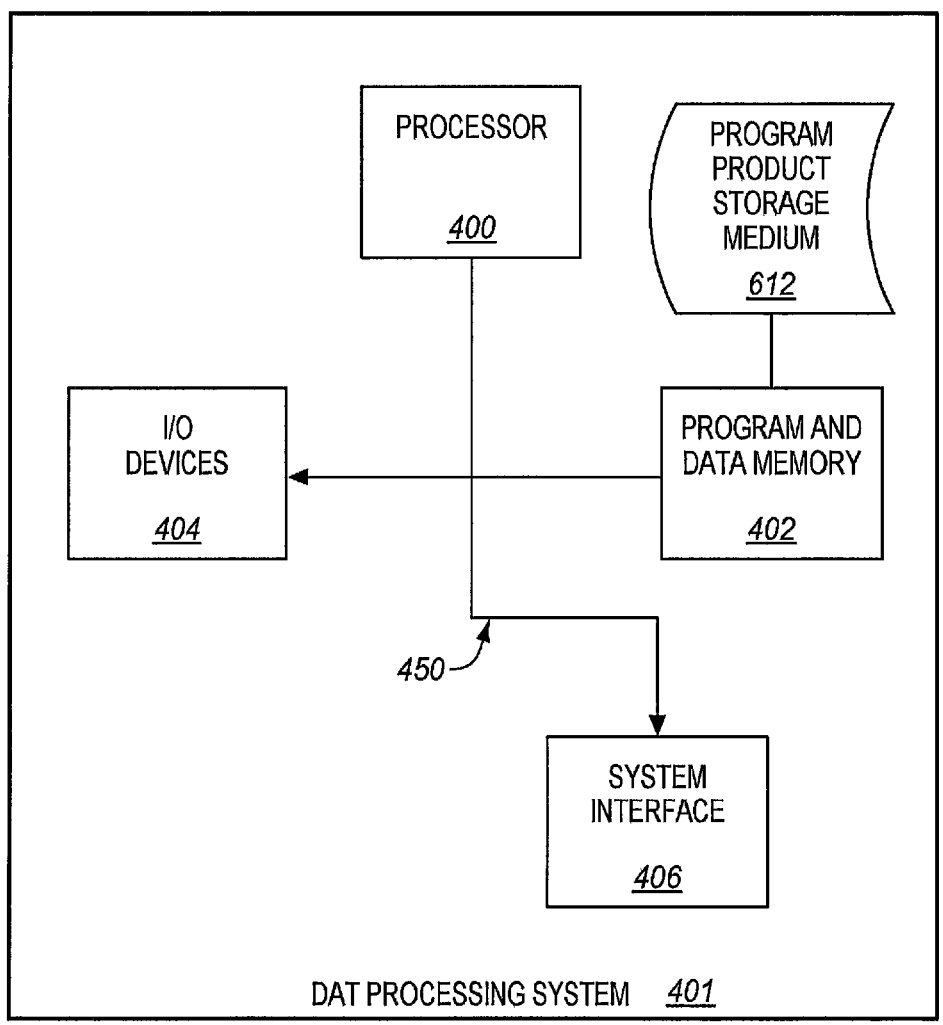
FIG. 4 is a block diagram of a system adapted to process computer readable medium embodying computer program products implementing methods in accordance with features and aspects hereof to migrate a database using serialization and deserialization techniques.

Embodiments of the invention can take the form of an entirely hardware embodiment, an entirely software embodiment or an embodiment containing both hardware and software elements. In one embodiment, the invention is implemented in software, which includes but is not limited to firmware, resident software, microcode, etc. FIG. 4 is a block diagram depicting a data processing system 401 as a data processing device adapted to provide features and aspects hereof by executing programmed instructions and accessing data stored on a computer readable storage medium 412.

Furthermore, the invention can take the form of a computer program product accessible from the computer-readable storage medium 412 providing program code for use by a computer or any instruction execution system. For the purposes of this description, the computer readable storage medium can be any apparatus that can contain, store, communicate, or transport the program for use by the instruction execution system.

The medium can be an electronic, magnetic, optical, electromagnetic, infrared, or semiconductor system. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor 400 coupled directly or indirectly to memory elements 402 through a system bus 450. The memory elements can include local memory employed during actual execution of the program code, bulk storage, and cache memories which provide temporary storage of at least some program code in order to reduce the number of times code must be retrieved from bulk storage during execution.

Input/output or I/O devices 404 (including but not limited to keyboards, displays, pointing devices, etc.) can be coupled to the system either directly or through intervening I/O controllers. Network adapter interfaces 406 may also be coupled to the system to enable the data processing system to become coupled to other data processing systems or storage devices through intervening private or public networks. Modems, cable modems, IBM Channel attachments, SCSI, Fibre Channel, and Ethernet cards are just a few of the currently available types of network or host interface adapters.

Although specific embodiments were described herein, the scope of the invention is not limited to those specific embodiments. The scope of the invention is defined by the following claims and any equivalents thereof.

We claim:

1. A method for configuring attributes of a job for processing of the job in a workflow processing system, the method being operable in a processing system and comprising:

presenting attributes of the job to a user wherein the job attributes are grouped in accordance with aspects of a workflow model associated with execution of the job in the workflow processing system and wherein the job attributes provide for processing of already constructed documents; and generating attribute values for attributes of the job based on user input, wherein the workflow model defines processing for the job as a sequence of one or more phases each comprising one or more processes each process comprising one or more steps, wherein the step of presenting further comprises:
grouping attributes for presentation that relate to each phase;
grouping attributes for presentation that relate to each process of each phase; and
grouping attributes for presentation that relate to each step of each process of each phase, wherein an attribute of the job relates to multiple steps, processes, and/or phases of the workflow model and are grouped for presentation with each of the multiple steps, processes, and/or phases with which the attribute is related, wherein the method further comprises:
providing a default value for one or more attributes of the job by:
providing a step default value based on a step to which the attribute relates;
overriding the step default value with a job type default value based on a job type to which the attribute relates if the job type default value differs from the step default value; and
overriding the step default value and any job type default value with a job specific default value based on the particular job to which the attribute relates if the job specific default value differs from the step default value or differs from the job type default value.

2. The method of claim 1
wherein each step is derived from an associated step template and a step template may be used to derive multiple instances of a step in a workflow model,
wherein a different step default value may be defined for each of multiple instances of a step derived from a step template, and
wherein the step of providing a step default value further comprises:
providing a step default value based on the instance of the step to which the attribute is related.

3. The method of claim 1
wherein the step of generating further comprises:
computing a default value of an attribute as a function of present status of the environment in which the job is executed.

4. The method of claim 3
wherein the step of computing further comprises:
dynamically determining the function to be computed by symbol replacement of symbols in a function template to thereby generate the function to be computed.

5. A computer program product operable in a workflow processing system for processing a job in accordance with a plurality of attributes associated with the job, the computer program product comprising a non-transitory computer readable medium embodying a computer readable program, wherein the computer readable program when executed on a workflow processing system causes the workflow processing system to perform a method to configure the attribute values, the method steps comprising:
 presenting to a user with attributes of the job grouped in accordance with aspects of an associated workflow model and wherein the job attributes provide for processing of already constructed documents; and
 generating attribute values for attributes of the job,
 wherein the workflow model defines processing for the job as a sequence of one or more phases each comprising one or more processes each process comprising one or more steps,
 wherein the step of presenting further comprises:
  grouping attributes for presentation that relate to each phase;
  grouping attributes for presentation that relate to each process of each phase; and
  grouping attributes for presentation that relate to each step of each process of each phase
 wherein an attribute of the job relates to multiple steps, processes, and/or phases of the workflow model and are grouped for presentation with each of the multiple steps, processes, and/or phases with which the attribute is related,
 wherein the method further comprises:
  providing a default value for one or more attributes of the job by:
   providing a step default value based on a step to which the attribute relates;
   overriding the step default value with a job type default value based on a job type to which the attribute relates if the job type default value differs from the step default value; and
   overriding the step default value and any job type default value with a job specific default value based on the particular job to which the attribute relates if the job specific default value differs from the step default value or differs from the job type default value.

6. The non transitory computer program product of claim 5
wherein each step is derived from an associated step template and a step template may be used to derive multiple instances of a step in a workflow model,
wherein a different step default value may be defined for each of multiple instances of a step derived from a step template, and
wherein the step of providing a step default value further comprises:
providing a step default value based on the instance of the step to which the attribute is related.

7. The non transitory computer program product of claim 5
wherein the step of generating further comprises:
computing an attribute as a function of present status of the environment in which the job is executed.

8. The non transitory computer program product of claim 7
wherein the step of computing further comprises:
dynamically determining the function to be computed by symbol replacement of symbols in a function template to thereby generate the function to be computed.

* * * * *